US011682985B2

(12) United States Patent
Takahashi et al.

(10) Patent No.: US 11,682,985 B2
(45) Date of Patent: Jun. 20, 2023

(54) PIEZOELECTRIC DRIVING DEVICE AND ROBOT COMPRISING THE SAME

(71) Applicant: SEIKO EPSON CORPORATION, Tokyo (JP)

(72) Inventors: Tomoaki Takahashi, Matsumoto (JP); Kiichi Kajino, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 16 days.

(21) Appl. No.: 17/481,333

(22) Filed: Sep. 22, 2021

(65) Prior Publication Data

US 2022/0094281 A1 Mar. 24, 2022

(30) Foreign Application Priority Data

Sep. 23, 2020 (JP) .............................. JP2020-158307

(51) Int. Cl.
*H02N 2/10* (2006.01)
*B25J 9/12* (2006.01)
(52) U.S. Cl.
CPC .............. *H02N 2/103* (2013.01); *B25J 9/123* (2013.01)

(58) Field of Classification Search
CPC ...... H02N 2/103; H02N 2/0025; H02N 2/005; H02N 2/0085; H02N 2/22; H02N 2/10; H02N 2/12; B25J 9/123; B25J 9/12
See application file for complete search history.

(56) References Cited

U.S. PATENT DOCUMENTS

| 2009/0256445 | A1 | 10/2009 | Kotani |
| 2014/0063129 | A1* | 3/2014 | Kondo ................. B41J 2/14233 29/25.35 |
| 2017/0001306 | A1 | 1/2017 | Arakawa et al. |
| 2018/0065365 | A1* | 3/2018 | Hirai ..................... B41J 2/1626 |
| 2019/0016126 | A1* | 1/2019 | Hirai .................... B41J 2/04581 |

FOREIGN PATENT DOCUMENTS

| JP | 2005354787 A | 12/2005 |
| JP | 2009254198 A | 10/2009 |
| JP | 2017017916 A | 1/2017 |
| WO | 2005122381 A1 | 12/2005 |

* cited by examiner

Primary Examiner — Emily P Pham
(74) Attorney, Agent, or Firm — Yu Gang

(57) ABSTRACT

A piezoelectric driving device includes a substrate, a plurality of piezoelectric elements disposed on the substrate, a first groove section provided between the plurality of piezoelectric elements, and a first wire provided in at least a part of a side surface and a bottom section of the first groove section.

7 Claims, 10 Drawing Sheets

PIEZOELECTRIC DRIVING DEVICE AND ROBOT COMPRISING THE SAME The present application is based on, and claims priority from JP Application Serial Number 2020-158307, filed Sep. 23, 2020, the disclosure of which is hereby incorporated by reference herein in its entirety.

BACKGROUND

1. Technical Field

The present disclosure relates to a piezoelectric driving device and a robot.

2. Related Art

In recent years, a piezoelectric motor that makes use of vibration of a piezoelectric element has been developed. As such a piezoelectric motor, for example, JP-A-2009-254198 (Patent Literature 1) discloses an ultrasonic motor including an ultrasonic transducer including a plurality of piezoelectric elements. The ultrasonic transducer functions as a piezoelectric driving device and inputs an electric signal to the piezoelectric elements. The ultrasonic transducer vibrates with vibration of the piezoelectric elements. The vibration of the ultrasonic transducer is transmitted to a contact section that comes into contact with a rotor. Consequently, the rotor can be rotated.

However, in the ultrasonic transducer, which is the piezoelectric driving device, described in Patent Literature 1, when the piezoelectric elements are reduced in size in order to obtain a high power to weight ratio, wires for inputting the electric signal to the plurality of piezoelectric elements are reduced in thickness and wiring resistance increases. Accordingly, driving efficiency is deteriorated and a high power to weight ratio cannot be obtained.

SUMMARY

A piezoelectric driving device includes: a substrate; a plurality of piezoelectric elements disposed on the substrate; a first groove section provided between the plurality of piezoelectric elements; and a first wire provided in at least a part of a side surface and a bottom section of the first groove section.

A robot includes a piezoelectric motor including the piezoelectric driving device described above.

DESCRIPTION OF EXEMPLARY EMBODIMENTS

1. First Embodiment

First, about a piezoelectric driving device 3 according to a first embodiment, a piezoelectric motor 1 including the piezoelectric driving device 3 is explained as an example with reference to FIGS. 1 to 5.

Figure 11:
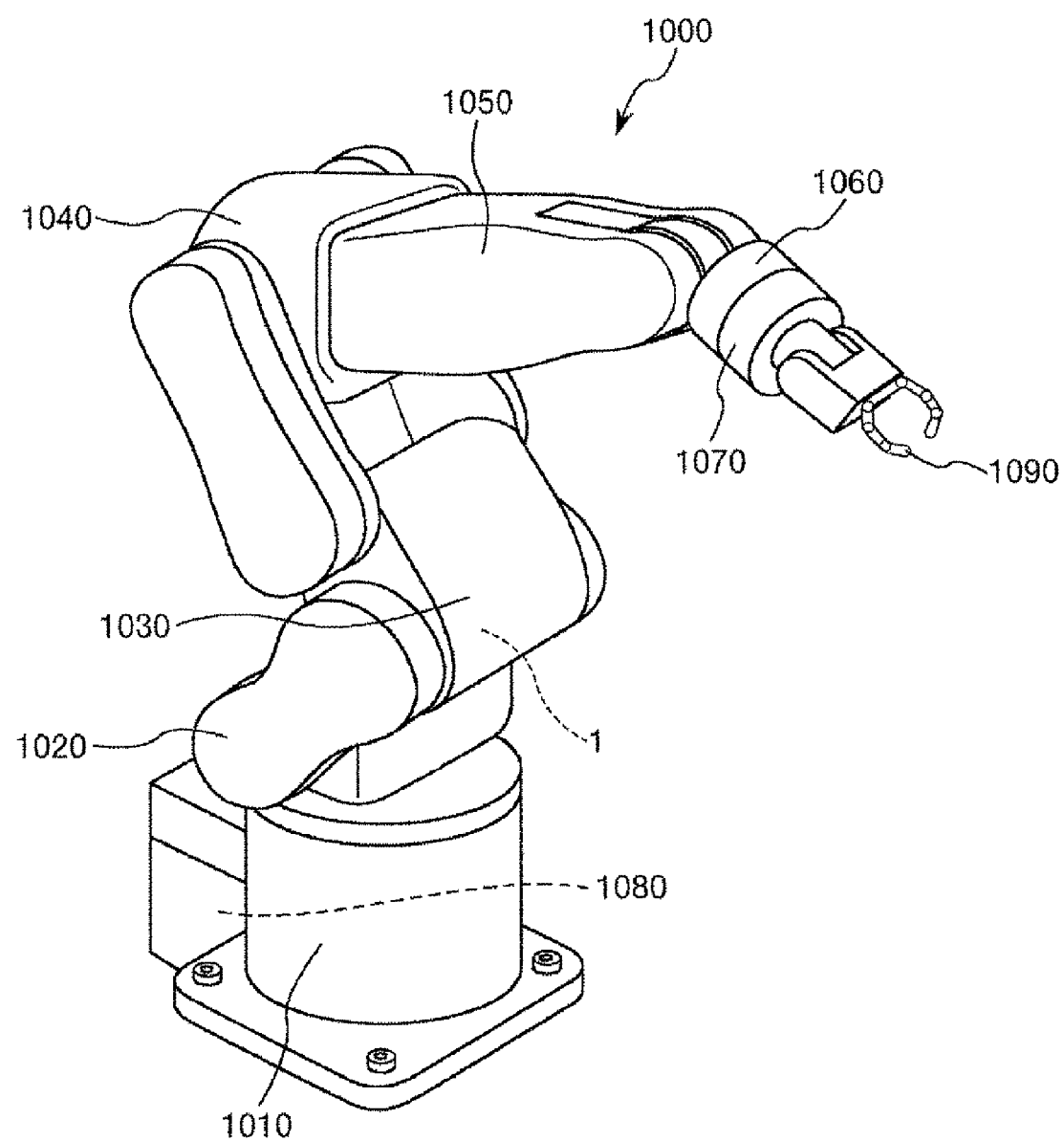
FIG. 11 is a perspective view showing a schematic configuration of a robot including a piezoelectric driving device according to a fourth embodiment.

For convenience of explanation, in the figures excluding FIGS. 6 and 11 in the following explanation, an X axis, a Y axis, and a Z axis are illustrated as three axes orthogonal to one another. A direction along the X axis is referred to as "X direction", a direction along the Y axis is referred to as "Y direction", and a direction along the Z axis is referred to as "Z direction". An arrow side of the axes is referred to as "plus side" and the opposite side of the arrow side is referred to as "minus side". The plus side of the X direction is referred to "upper" as well and the minus side of the X direction is referred to as "lower" as well.

Figure 1:
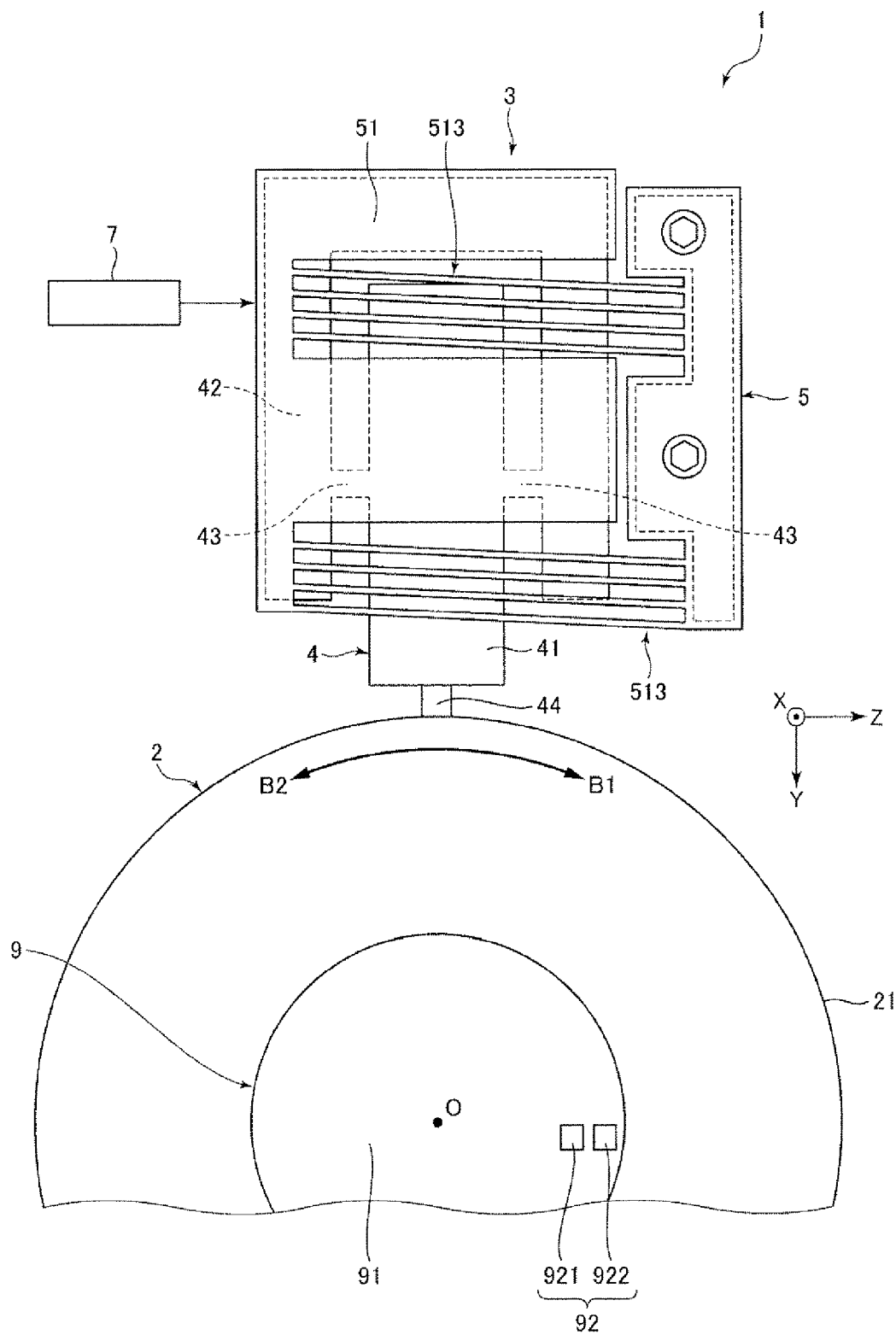
FIG. 1 is a plan view showing a schematic configuration of a piezoelectric motor including a piezoelectric driving device according to a first embodiment.

The piezoelectric motor 1 includes, as shown in FIG. 1, a rotor 2 functioning as a driven member formed in a disk shape and capable of rotating around a center axis O of the rotor 2 and a piezoelectric driving device 3 that comes into contact with an outer circumferential surface 21 of the rotor 2. In such a piezoelectric motor 1, when the piezoelectric driving device 3 is caused to perform bending vibration, the rotor 2 rotates around the center axis O parallel to the X axis.

An encoder 9 is provided in the rotor 2. The behavior, in particular, a rotation amount and angular velocity of the rotor 2 can be detected by the encoder 9. The encoder 9 includes a scale 91 fixed to the upper surface of the rotor 2 and an optical element 92 provided on the upper side of the scale 91. The scale 91 is formed in a disk shape. A not-shown pattern is provided on the upper surface of the scale 91. On the other hand, the optical element 92 includes a light emitting element 921 that irradiates light toward the pattern of the scale 91 and an imaging element 922 that images the pattern of the scale 91. In the encoder 9 having such a configuration, a rotation amount, driving speed, an absolute position, and the like of the rotor 2 can be detected by performing template matching of an image of the pattern acquired by the imaging element 922.

The piezoelectric driving device 3 in this embodiment includes a vibrating piezoelectric actuator 4, an urging member 5 that urges the piezoelectric actuator 4 toward the rotor 2, and a control device 7 that controls driving of the piezoelectric actuator 4.

The piezoelectric actuator 4 includes a vibrating body 41, a supporting section 42 supporting the vibrating body 41, a connecting section 43 connecting the vibrating body 41 and the supporting section 42, and a projecting section 44 that is connected to the vibrating body 41 and transmits vibration of the vibrating body 41 to the rotor 2.

Figure 2:
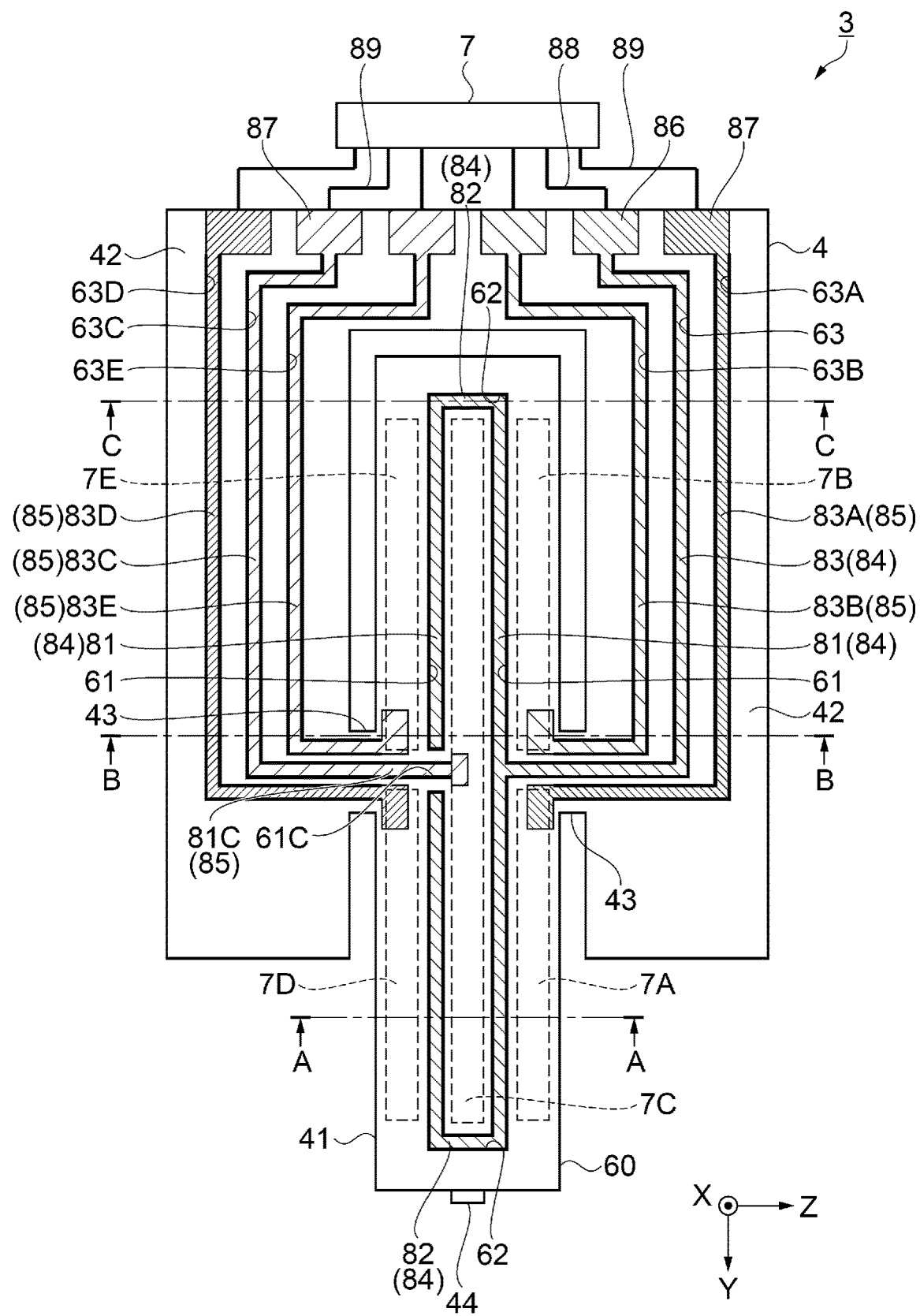
FIG. 2 is a plan view showing a schematic configuration of the piezoelectric driving device according to the first embodiment.

As shown in FIG. 2, the vibrating body 41 is formed in a plate shape having the X direction as the thickness direction and spreading on a Y-Z plane including the Y axis and the Z axis. The vibrating body 41 bends in the Z direction while extending and contracting in the Y direction to thereby perform bending vibration in an S shape. In a plan view from the X direction, the vibrating body 41 is formed in a longitudinal shape having the Y direction, which is an extending and contracting direction, as a longitudinal direction.

The vibrating body 41 includes a substrate 60 and five piezoelectric elements 7A to 7E for driving for causing the vibrating body 41 to perform bending vibration.

The piezoelectric element 7C is disposed along the Y direction, which is the longitudinal direction of the substrate 60, in the center in the Z direction of the substrate 60. The piezoelectric elements 7A and 7B are disposed side by side in the longitudinal direction of the substrate 60 on the plus side of the Z direction of the substrate 60 with respect to the piezoelectric element 7C. The piezoelectric elements 7D and 7E are disposed side by side in the longitudinal direction of the substrate 60 on the minus side of the Z direction.

Figure 3:
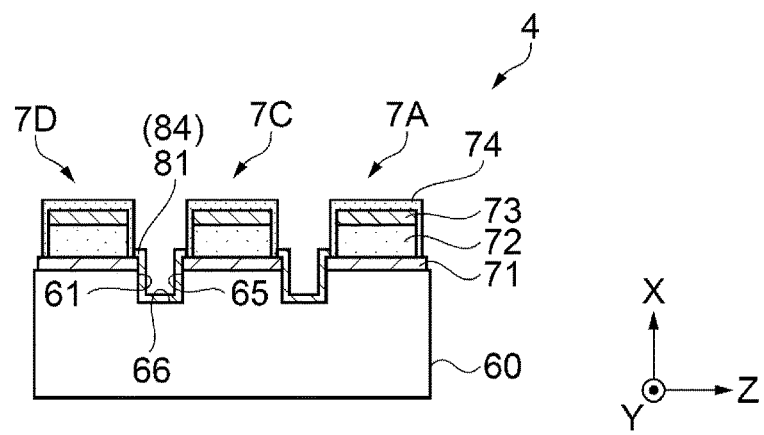
FIG. 3 is an A-A line sectional view in FIG. 2.

The piezoelectric elements 7A to 7E each include, as shown in FIG. 3, a first electrode 71 disposed on the substrate 60, a piezoelectric body 72 disposed on the first electrode 71, and a second electrode 73 disposed on the piezoelectric body 72. Insulating layers 74 for preventing short-circuit between electrodes are provided on the second electrodes 73. The first electrode 71, the piezoelectric body 72, and the second electrode 73 are individually provided in each of the piezoelectric elements 7A to 7E. The second electrodes 73 are electrodes for vibration that vibrate the piezoelectric bodies 72 of the piezoelectric elements 7A to 7E for driving based on an electric signal. The first electrode 71 of each of the piezoelectric elements 7A to 7E is a common electrode electrically coupled by a first wire 81 provided in a first groove section 61 explained below.

The piezoelectric element 7C performs longitudinal vibration for extending and contracting the vibrating body 41 in the Y direction, which is the longitudinal direction of the vibrating body 41, with energization. The second electrodes 73 on the piezoelectric elements 7A and 7E are electrically coupled to each other and the second electrodes 73 on the piezoelectric elements 7B and 7D are electrically coupled to each other to perform bending vibration for bending the vibrating body 41 in the Z direction. Accordingly, the vibrating body 41 can be caused to perform bending vibration in an S shape in the plane of the vibrating body 41 by applying alternating voltages having different phases and the same frequency respectively to the piezoelectric element 7C, the piezoelectric elements 7A and 7E, and the piezoelectric elements 7B and 7D as electric signals and shifting extension and contraction timings of the piezoelectric element 7C, the piezoelectric elements 7A and 7E, and the piezoelectric elements 7B and 7D. That is, the piezoelectric driving device 3 in this embodiment is an in-plane vibration type in which the vibrating body 41 is displaced and vibrates in the Y-Z plane with the vibration of the piezoelectric elements 7A to 7E.

First groove sections 61 and 61C and second groove sections 62 are provided on a surface of the substrate 60 on which the piezoelectric elements 7A to 7E are disposed. The substrate 60 is made of silicon excellent in machining accuracy in groove formation and the like.

The first groove sections 61 extend in the Y direction, which is the longitudinal direction of the substrate 60, and are disposed between the piezoelectric element 7A and the piezoelectric element 7C, between the piezoelectric element 7B and the piezoelectric element 7C, between the piezoelectric element 7C and the piezoelectric element 7D, and between the piezoelectric element 7C and the piezoelectric element 7E in the plan view from the X direction. End portions in the Y direction of the first groove section 61 between the piezoelectric element 7A and the piezoelectric element 7C and the first groove section 61 between the piezoelectric element 7B and the piezoelectric element 7C are coupled to each other. As shown in FIG. 3, a first wire 81 is provided in at least a part of a side surface 65 and a bottom section 66 of the first groove section 61.

When a piezoelectric element interval is set to 60 μm, a wiring width between the elements is 50 μm at most. Accordingly, a substantial wiring width can be set to 100 μm and wiring resistance can be halved by providing the first groove section 61 having width of 50 μm and groove depth of 25 μm between the elements and providing the first wire 81 in the side surface 65 and the bottom section 66 of the first groove section 61.

The first groove section 61C is disposed between two piezoelectric elements 70 and 7E and extends in the Z direction orthogonal to the direction in which the first groove sections 61 extend. A first wire 81C is provided in at least a part of the side surface 65 and the bottom section 66 of the first groove section 61C.

Figure 5:
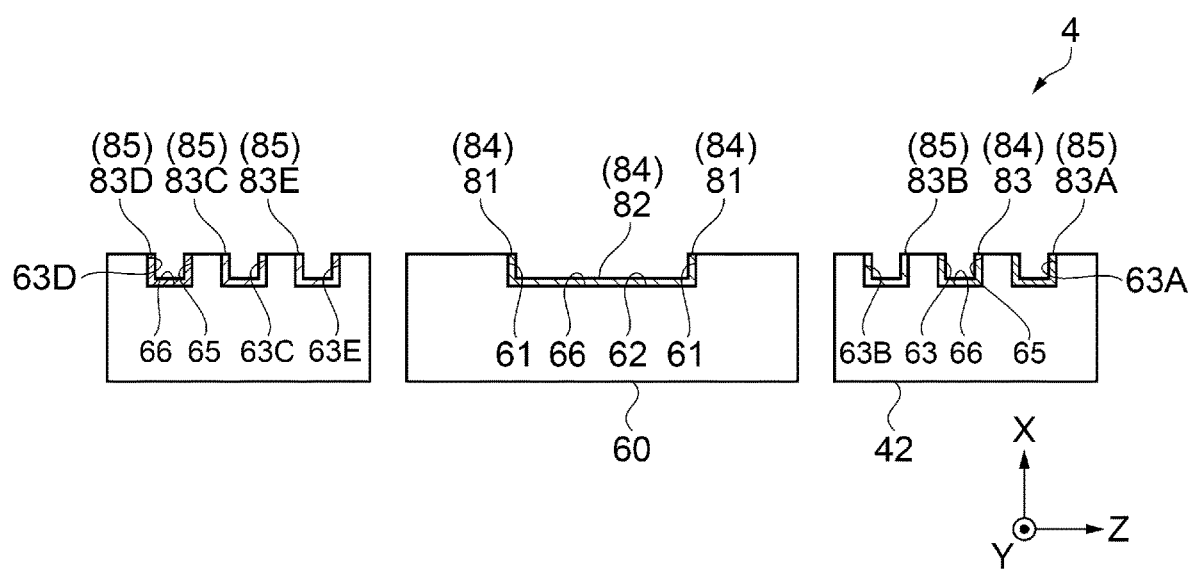
FIG. 5 is a C-C line sectional view in FIG. 2.

The second groove sections 62 are respectively disposed on both end sides in the longitudinal direction of the piezoelectric element 7C, that is, the plus side and the minus side of the Y direction of the piezoelectric element 7C and are coupled to the first groove section 61 disposed between the piezoelectric elements 7A and 7B and the piezoelectric element 7C and the first groove section 61 disposed between the piezoelectric element 7C and the piezoelectric elements 7D and 7E. Specifically, the second groove section 62 disposed on the plus side of the Y direction of the piezoelectric element 7C is coupled to the first groove section 61 disposed between the piezoelectric element 7A and the piezoelectric element 7C and the first groove section 61 disposed between the piezoelectric element 7C and the piezoelectric element 7D. The second groove section 62 disposed on the minus side of the Y direction of the piezoelectric element 7C is coupled to the first groove section 61 disposed between the piezoelectric element 7B and the piezoelectric element 7C and the first groove section 61 disposed between the piezoelectric element 7C and the piezoelectric element 7E. As shown in FIG. 5, a second wire 82 is provided in at least a part of the side surface 65 and the bottom section 66 of the second groove section 62 to couple the first wires 81 provided in the first groove sections 61. Specifically, the second wire 82 electrically couples the first wire 81 provided in the first groove section 61 disposed between the piezoelectric elements 7A and 7B and the piezoelectric element 70 and the first wire 81 provided in the first groove section 61 disposed between the piezoelectric element 7C and the piezoelectric elements 7D and 7E.

The supporting section 42 supports, via the connecting section 43, the substrate 60 to be the vibrating body 41. The supporting section 42 is formed in a U shape surrounding the minus side of the Y direction of the vibrating body 41 in the plan view from the X direction. The connecting section 43 connects portions to be nodes of the bending vibration of the vibrating body 41, specifically, the center in the Y direction of the vibrating body 41 and the supporting section 42.

Six third groove sections 63, 63A, 63B, 63C, 63D, and 63E, a terminal for common electrode 86, and five terminals for driving electrode 87 are provided on the supporting section 42. The six third groove sections 63, 63A, 63B, 63C, 63D, and 63E are each provided in the connecting section 43 as well. The terminal for common electrode 86 and the five terminals for driving electrode 87 are disposed side by side along the Z direction at the end portion on the minus side of the Y direction of the supporting section 42.

In the third groove sections 63, 63A, 63B, 63C, 63D, and 63E provided in the supporting section 42 and the connecting section 43, third wires 83, 83A, 83B, 83C, 83D, and 83E are respectively provided in at least a part of the side surfaces 65 and the bottom sections 66 of the third groove sections 63, 63A, 63B, 63C, 63D, and 63E.

One end portion of the third wire 83 is electrically coupled to the terminal for common electrode 86. The other end portion of the third wire 83 is electrically coupled to the first wire 81 provided in the first groove section 61 disposed between the piezoelectric elements 7A and 7B and the piezoelectric element 7C.

Figure 4:
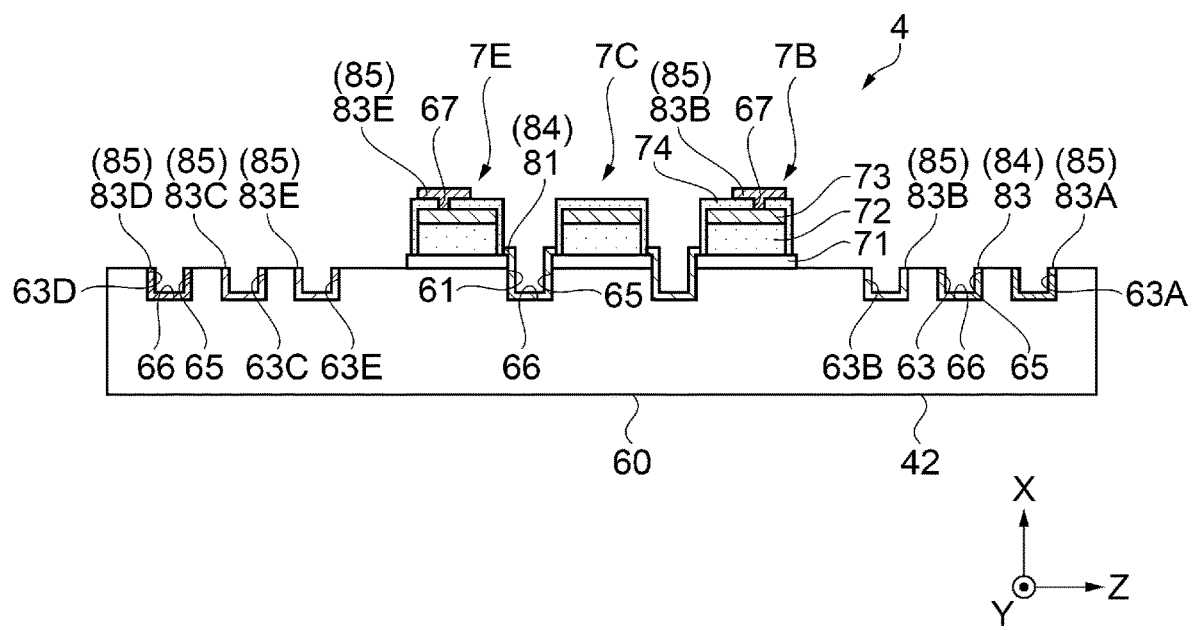
FIG. 4 is a B-B line sectional view in FIG. 2.

One end portion of the third wire 83B is electrically coupled to the terminal for driving electrode 87. The other end portion of the third wire 83B is electrically coupled to the third wire 83B provided on the piezoelectric element 7B. As shown in FIG. 4, the third wire 83B provided on the piezoelectric element 7B is electrically coupled to the second electrode 73 of the piezoelectric element 7B via an electrode in a through-hole 67 provided in an insulating layer 74 of the piezoelectric element 7B. Accordingly, the second electrode 73 of the piezoelectric element 7B is electrically coupled to the terminal for driving electrode 87 via the third wire 83B.

Like the third wire 83B, one ends of the three third wires 83A, 83D, and 83E are electrically coupled to the terminal for driving electrode 87. The other end portions of the three third wires 83A, 83D, and 83E are respectively electrically coupled to the second electrodes 73 of the piezoelectric elements 7A, 7D, and 7E.

One end portion of the third wire 83C is electrically coupled to the terminal for driving electrode 87. The other end portion of the third wire 83C is electrically coupled to the first wire 81C provided on the piezoelectric element 7C via the first wire 81C provided in the first groove section 61C. Like the third wire 83B, the first wire 81C provided on the piezoelectric element 70 is electrically coupled to the second electrode 73 of the piezoelectric element 7C via an electrode in the through-hole 67 provided in the insulating layer 74 of the piezoelectric element 7C.

The first wire 81, the second wire 82, and the third wire 83 electrically coupled to the first electrodes 71 of the piezoelectric elements TA to 7E are the wires for common electrode 84 and are grounded to GND. The first wire 81, the second wire 82, and the third wire 83 are electrically coupled to the control device 7 from the terminal for common electrode 86 via an external wire 88.

The first wire 81C and the third wires 83A, 83B, 83C, 83D, and 83E electrically coupled to the second electrodes 73 of the piezoelectric elements 7A to 7E are the wires for driving electrode 85. The first wire 81C and the third wires 83A, 83B, 83C 83D, and 83E are electrically coupled to the control device 7 from the terminal for driving electrode 87 via an external wire 89.

The projecting section 44 is provided at the distal end portion of the vibrating body 41 and projects to the plus side of the Y direction from the vibrating body 41. The distal end portion of the projecting section 44 is in contact with the outer circumferential surface 21 of the rotor 2. Accordingly, vibration of the vibrating body 41 is transmitted to the rotor 2 via the projecting section 44. By respectively adjusting alternating, voltages applied to the piezoelectric elements 7A to 7E, it is possible to shift extension and contraction timings to, as shown in FIG. 1, rotate the rotor 2 clockwise as indicated by an arrow B1 and rotate the rotor 2 counterclockwise as indicated by an arrow B2.

The urging member 5 is a member that urges the projecting section 44 toward the outer circumferential surface 21 of the rotor 2. The urging member 5 is fixed to a housing or the like in a state in which a spring section 513 provided in a base 51 supporting the piezoelectric actuator 4 is bent in the Y direction, whereby the urging member 5 can urge the projecting section 44 toward the outer circumferential surface 21 of the rotor 2 making use of a restoration force of the sprig section 513.

The control device 7 applies alternating voltages having different phases and the same frequency to the piezoelectric elements 7A to 7E as electric signals to thereby control driving of the piezoelectric driving device 3.

A manufacturing method for the piezoelectric driving device 3 according to the first embodiment is explained with reference to FIG. 6.

Figure 6:
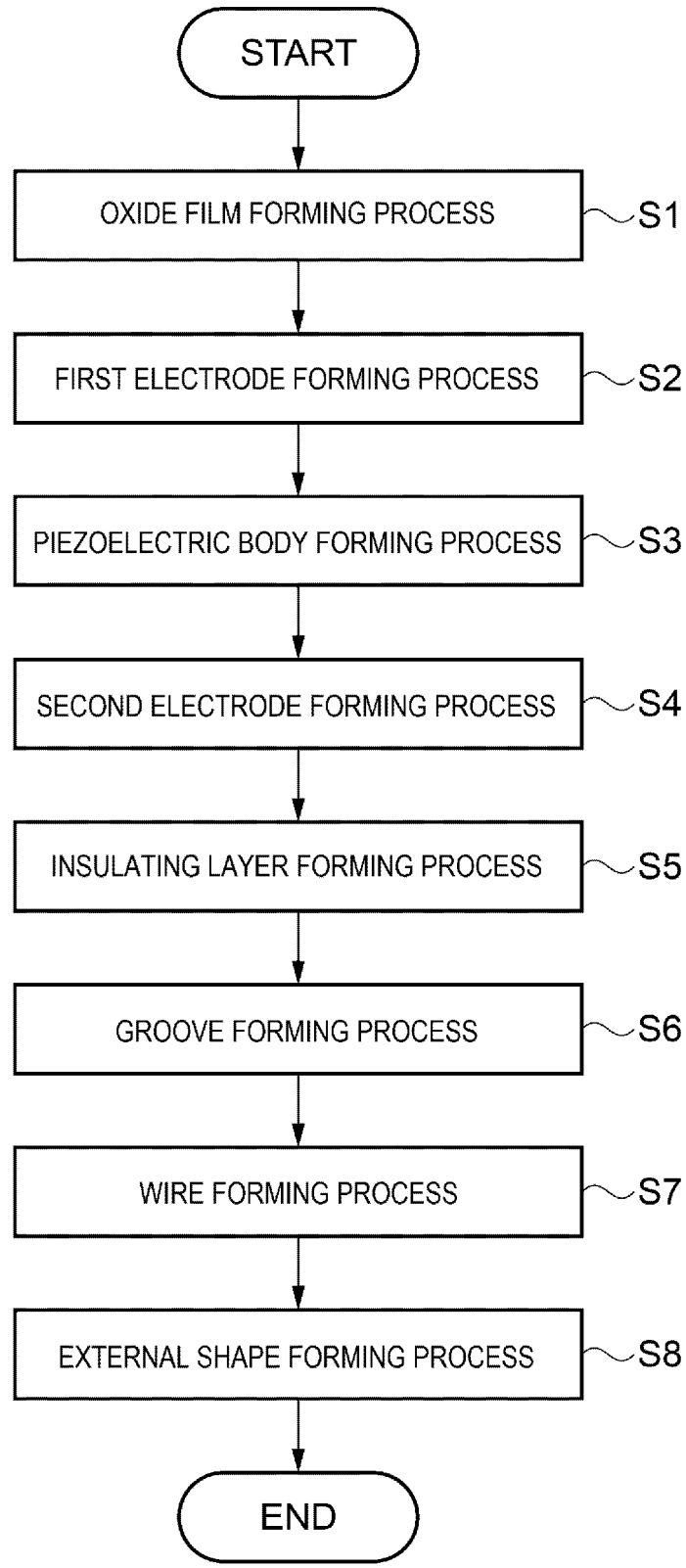
FIG. 6 is a flowchart showing a manufacturing method for the piezoelectric driving device.

The manufacturing method for the piezoelectric driving device 3 includes, as shown in FIG. 6, an oxide film forming process, a first electrode forming process, a piezoelectric body forming process, a second electrode forming process, an insulating layer forming process, a groove forming process, a wire forming process, and an external shape forming process.

1.1 Oxide Film Forming Process

First, in step S1, a silicon substrate is prepared. The silicon substrate is heated at high temperature in the air to form an oxide film to be an insulating layer on the surface of the silicon substrate.

1.2 First Electrode Forming Process

Subsequently, in step S2, metal such as gold (Au), platinum (Pt), or iridium (Ir) is formed as a film on the oxide film of the silicon substrate by a sputtering method or an evaporation method to form the first electrode 71.

1.3 Piezoelectric Body Forming Process

Subsequently, in step S3, a piezoelectric layer is formed on the first electrode 71 using a sol-gel method or a sputtering method. Thereafter, the piezoelectric layer and the first electrode 71 are patterned by a photolithography method to form a piezoelectric element pattern and form the piezoelectric body 72. As a constituent material of the piezoelectric body 72, piezoelectric ceramics such as lead zirconate titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, and lead scandium niobate can be used.

1.4 Second Electrode Forming Process

Subsequently, in step S4, as in the first electrode 71, metal such as gold (Au), platinum (Pt), or iridium (Ir) is formed as a film on the oxide film of the silicon substrate by the sputtering method or the evaporation method. Thereafter, a piezoelectric element pattern is formed by the photolithography method to form the second electrode 73.

1.5 Insulating Layer Forming Process

Subsequently, in step S5, an insulating film of $SiO_2$ or $Al_2O_3$ is formed on the second electrode 73 by a CVD (Chemical Vapor Deposition) method. Thereafter, a piezoelectric element pattern is formed by the photolithography method to form the insulating layer 74. In order to electrically couple the second electrodes 73 of the piezoelectric elements 7A to 7E and the third wires 83A, 83B, 83D, and 83E or the first wire 81C, the through-holes 67 are formed in the second electrodes 73 by an RIE (Reactive Ion Etching) method.

1.6 Groove Forming Process

Subsequently, in step S6, by dry etching such as the RIE method or an ICP (Inductively Coupled Plasma) method, the first groove section 61, the second groove section 62, the third groove section 63, and the like are half-etched to predetermined depth and formed around the piezoelectric elements 7A to 7E and on the silicon substrate equivalent to the supporting section 42. When the thickness of the silicon substrate is 50 μm, the depth of the grooves is suitably 25 μm. When the thickness of the silicon substrate is 20 μm to 200 μm, the depth of the grooves is suitably 10 μm to 100 μm, which is half of the thickness of the silicon substrate.

1.7 Wire Forming Process

Subsequently, in step S7, metal such as gold (Au), copper (Cu), or aluminum (Al) is formed as a film on the silicon substrate and the insulating layer 74 by the sputtering method or the evaporation method. Thereafter, a wiring pattern is formed by the photolithography method to form the first wire 81, the second wire 82, the third wire 83, and the like. When a metal film is formed on the side surface 65 of the groove, it is preferable to use a plasma CVD method having a good wraparound property to the side surface 65 of the groove. In the case of the sputtering method, it is preferable to form a film while obliquely disposing and rotating the silicon substrate. The thickness of the wire is suitably 2 μm but may be in a range of 0.5 μm to 5 μm.

1.8 External Shape Forming Process

Subsequently, in step S8, a piezoelectric actuator external shape pattern in which the vibrating body 41, the supporting section 42, and the connecting section 43 are integrated is formed by the photolithography method. The external shape of the piezoelectric actuator 4 is formed by the dry etching such as the RIE method or the ICP method.

Consequently, it is possible to obtain the piezoelectric driving device 3 in which the first wire 81, the second wire 82, and the third wire 83 are provided in at least a part of the side surfaces 65 and the bottom sections 66 of the first groove sections 61 disposed among the plurality of piezoelectric elements 7A to 7E disposed on the substrate 60, the second groove sections 62 disposed around the piezoelectric element 7C, and the third groove section 63 disposed in the supporting section 42.

With the piezoelectric driving device 3 explained above, the first wires 81 are provided in at least a part of the side surfaces 65 and the bottom sections 66 of the first groove sections 61 disposed among the plurality of piezoelectric elements 7A to 7E disposed on the substrate 60. Therefore, in narrow regions among the piezoelectric elements 7A to 7E, the sectional area of the first wires 81 can be increased and wiring resistance can be reduced. Accordingly, it is possible to improve driving efficiency and obtain the piezoelectric driving device 3 having a high power to weight ratio.

2. Second Embodiment

Subsequently, a piezoelectric driving device 3a according to a second embodiment is explained with reference to FIGS. 7 and 8.

The piezoelectric driving device 3a in this embodiment is the same as the piezoelectric driving device 3 in the first embodiment except that the first groove section 61C and the third groove sections 63, 63A, 63B, 63C, 63D, and 63E are not provided in a piezoelectric actuator 4a. The difference from the first embodiment is mainly explained. Explanation about similarities to the first embodiment is omitted. In FIGS. 7 and 8, the same components as the components in the first embodiment are denoted by the same reference numerals and signs.

Figure 7:
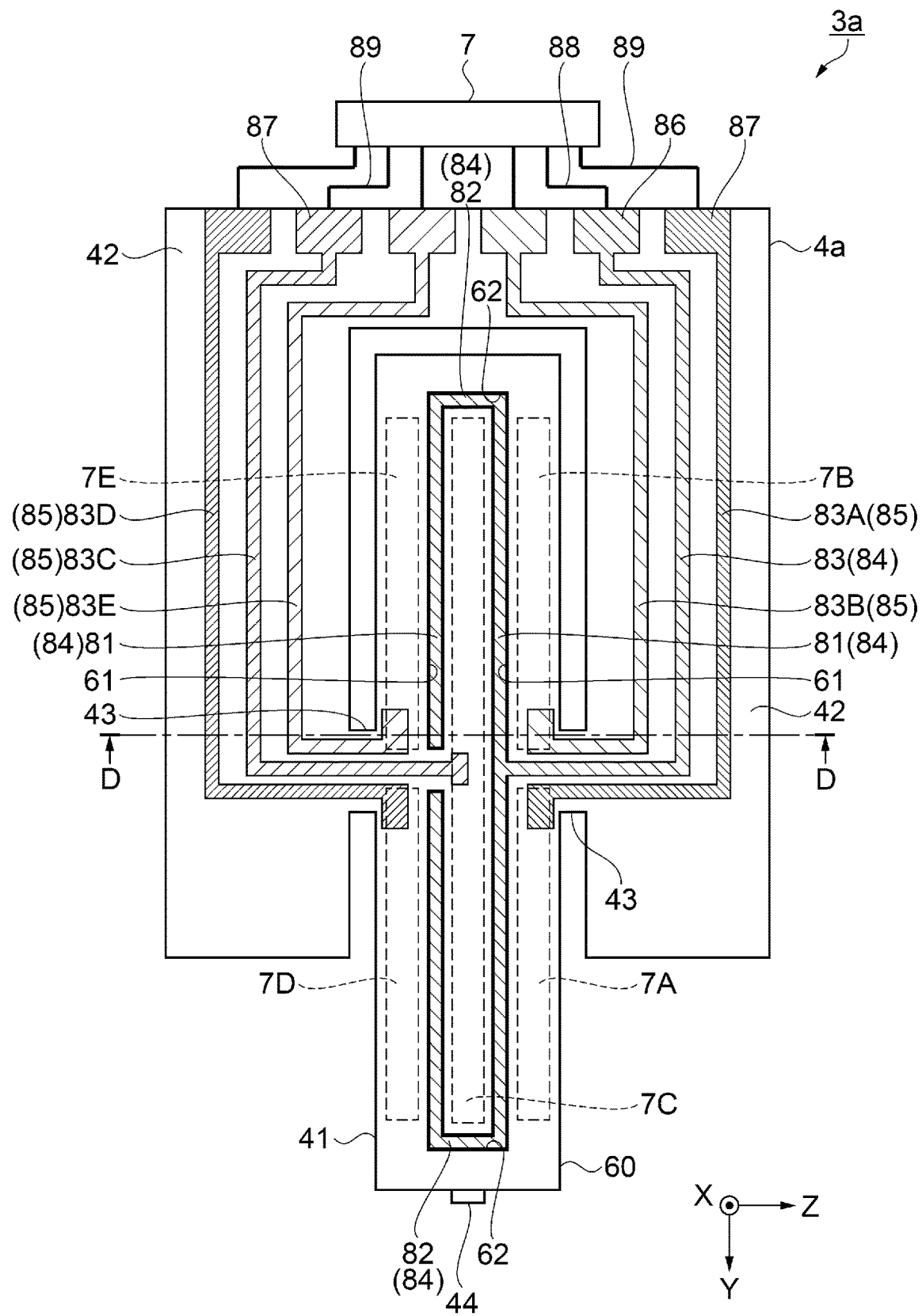
FIG. 7 is a plan view showing a schematic configuration of a piezoelectric driving device according to a second embodiment.
Figure 8:
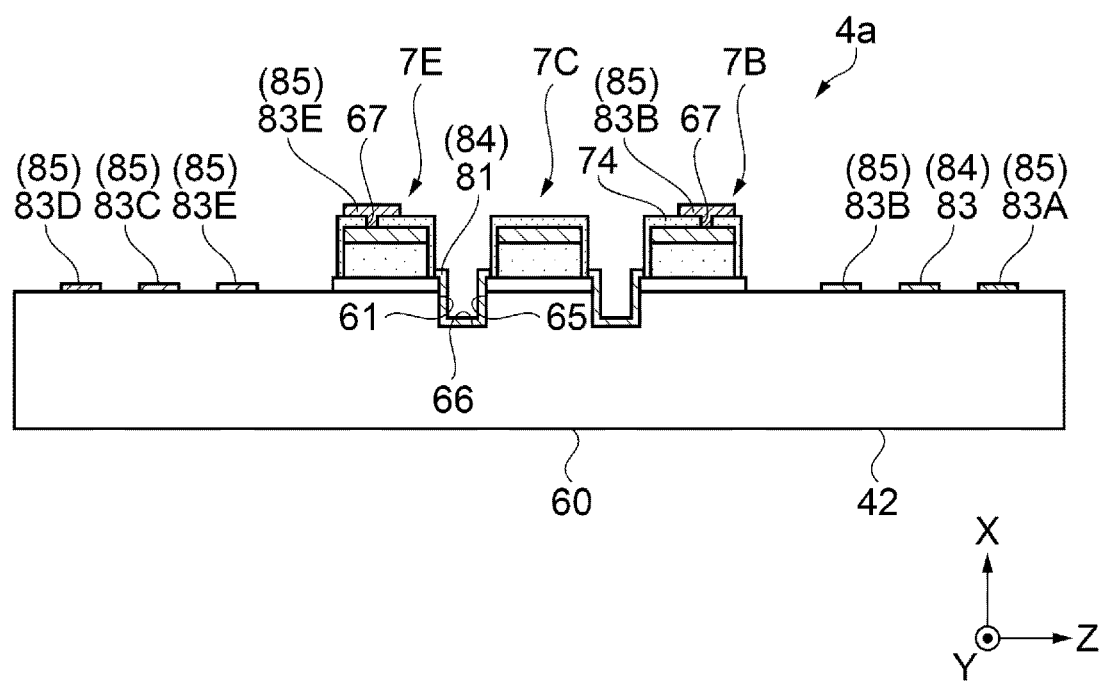
FIG. 8 is a D-D line sectional view in FIG. 7.

In the piezoelectric driving device 3a in this embodiment, as shown in FIG. 7, the first groove sections 61 and the second groove sections 62 are provided on the surface of the substrate 60 of the piezoelectric actuator 4a on which the piezoelectric elements 7A to 7E are disposed.

The first groove sections 61 extend in the Y direction, which is the longitudinal direction of the substrate 60, and are disposed between the piezoelectric element 7A and the piezoelectric element 7C, between the piezoelectric element 7B and the piezoelectric element 7C, between the piezoelectric element 70 and the piezoelectric element 7D, and between the piezoelectric element 70 and the piezoelectric element 7E in the plan view from the X direction. The end portions in the Y direction of the first groove section 61 between the piezoelectric element 7A and the piezoelectric element 7C and the first groove section 61 between the piezoelectric element 7B and the piezoelectric element 70 are coupled to each other. As shown in FIG. 8, the first wire 81 is provided in at least a part of the side surface 65 and the bottom section 66 of the first groove section 61.

The second groove sections 62 are respectively disposed on the plus side and the minus side of the Y direction of the piezoelectric element 70 and are coupled to the first groove section 61 disposed between the piezoelectric elements 7A and 7B and the piezoelectric element 7C and the first groove section 61 disposed between the piezoelectric element 7C and the piezoelectric elements 7D and 7E. The second wire 82 is provided in at least a part of the side surface 65 and the bottom section 66 of the second groove section 62 to electrically couple the first wire 81 provided in the first groove section 61 disposed between the piezoelectric elements 7A and 7B and the piezoelectric element 7C and the first wire 81 provided in the first groove section 61 disposed between the piezoelectric element 7C and the piezoelectric elements 7D and 7E.

With such a configuration, it is possible to obtain effects equivalent to the effects in the first embodiment. Compared with the first embodiment, the first groove section 61C and the third groove sections 63, 63A, 63B, 63C, 63D, and 63E are not formed in the piezoelectric actuator 4a. Therefore, an occurrence probability of disconnection and the like of wires in the groove sections decreases. Consequently, it is possible to achieve improvement of manufacturing yield.

3. Third Embodiment

A piezoelectric driving device 3b according to a third embodiment is explained with reference to FIGS. 9 and 10.

The piezoelectric driving device 3b in this embodiment is the same as the piezoelectric driving device 3 in the first embodiment except that the first groove section 61C, the second groove sections 62, and the third groove sections 63, 63A, 63B, 63C, 63D, and 63E are not provided in a piezoelectric actuator 4b. The difference from the first embodiment is mainly explained. Explanation about similarities to the first embodiment is omitted. In FIGS. 9 and 10, the same components as the components in the first embodiment are denoted by the same reference numerals and signs.

Figure 9:
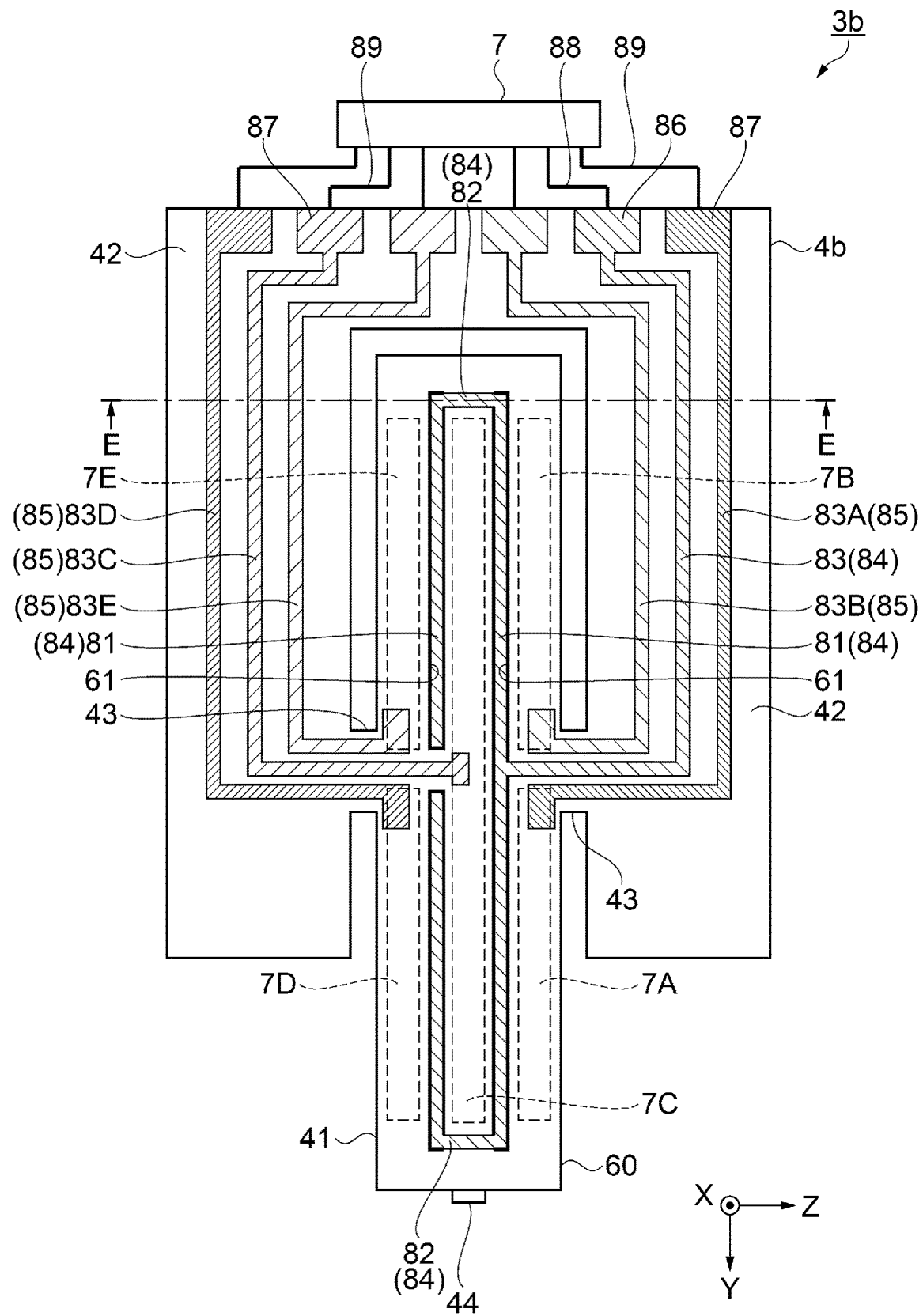
FIG. 9 is a plan view showing a schematic configuration of a piezoelectric driving device according to a third embodiment.
Figure 10:
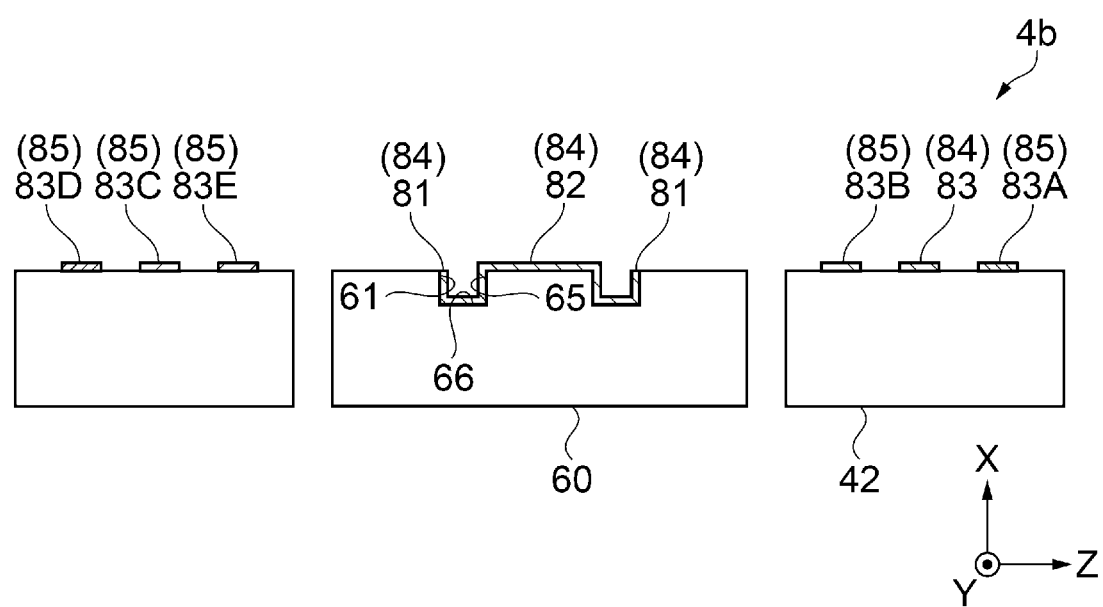
FIG. 10 is an E-E line sectional view in FIG. 9.

In the piezoelectric driving device 3b in this embodiment, as shown in FIG. 9, the first groove sections 61 are provided on the surface of the substrate 60 of the piezoelectric actuator 4b on which the piezoelectric elements 7A to 7E are disposed.

The first groove sections 61 extend in the Y direction, which is the longitudinal direction of the substrate 60, and are disposed between the piezoelectric element 7A and the piezoelectric element 7C, between the piezoelectric element 7B and the piezoelectric element 7C, between the piezoelectric element 7C and the piezoelectric element 7D, and between the piezoelectric element 7C and the piezoelectric element 7E in the plan view from the X direction. The end portions in the Y direction of the first groove section 61 between the piezoelectric element 7A and the piezoelectric element 7C and the first groove section 61 between the piezoelectric element 7B and the piezoelectric element 7C are coupled to each other. As shown in FIG. 10, the first wire 81 is provided in at least a part of the side surface 65 and the bottom section 66 of the first groove section 61. The first wires 81 provided in the first groove sections 61 on both sides of the piezoelectric element 7C are respectively electrically coupled by the second wires 82 at the end portions in the Y direction.

With such a configuration, it is possible to obtain effects equivalent to the effects in the first embodiment. Compared with the first embodiment, the first groove section 61C, the second groove sections 62, and the third groove sections 63, 63A, 63B, 63C, 63D, and 63E are not formed in the piezoelectric actuator 4b. Therefore, an occurrence probability of disconnection and the like of wires in the groove sections decreases. Consequently, it is possible to achieve improvement of manufacturing yield.

4. Fourth Embodiment

Subsequently, a robot 1000 including the piezoelectric driving device 3, 3a, or 3b according to a fourth embodiment is explained with reference to FIG. 11. In the following explanation, a configuration applied with the piezoelectric motor 1 including the piezoelectric driving device 3 is illustrated and explained.

The robot 1000 can perform work such as supply, removal, conveyance, and assembly of a precision instrument and components configuring the precision instrument. As shown in FIG. 11 the robot 1000 is a six-axis robot and includes a base 1010 fixed to a floor or a ceiling, an arm 1020 turnably coupled to the base 1010, an arm 1030 turnably coupled to the arm 1020, an arm 1040 turnably coupled to the arm 1030, an arm 1050 turnably coupled to the arm 1040, an arm 1060 turnably coupled to the arm 1050, an arm 1070 turnably coupled to the arm 1060, and a control device 1080 that controls driving of the arms 1020, 1030, 1040, 1050, 1060, and 1070.

A hand connecting section is provided in the arm 1070. An end effector 1090 corresponding to work to be executed by the robot 1000 is attached to the hand connecting section. The piezoelectric motor 1 is mounted on all or a part of joint sections. The arms 1020, 1030, 1040, 1050, 1060, and 1070 turn according to driving of the piezoelectric motor 1. The piezoelectric motor 1 may be mounted on the end effector 1090 and used for driving of the end effector 1090.

The control device 1080 is configured by a computer and includes, for example, a processor (a CPU), a memory, and an I/F (interface). The processor executes a predetermined program stored in the memory to control driving of the sections of the robot 1000. The program may be downloaded from an external server via the I/F. All or a part of the components of the control device 1080 may be provided on the outside of the robot 1000 and coupled via a communication network such as a LAN (local area network).

Such a robot 1000 includes the piezoelectric motor 1 as explained above. That is, the robot 1000 includes the piezoelectric driving device 3 including the piezoelectric actuator 4 and the control device 7 that controls vibration of the piezoelectric actuator 4. The piezoelectric driving device 3 vibrates the piezoelectric actuator 4 and drives the rotor 2 that comes into contact with the piezoelectric actuator 4. In the piezoelectric actuator 4, the first wires 81 are provided in the side surfaces 65 and the bottom sections 66 of the first groove sections 61 provided among the plurality of piezoelectric elements 7A to 7E disposed on the substrate 60. Therefore, the cross section of the first wires 81 increases and wiring resistance can be reduced. With such a robot 1000, a wiring structure having small wiring resistance is adopted in the piezoelectric driving apparatus 3. Therefore, it is possible to improve driving efficiency and realize the piezoelectric driving device 3 having a high power to weight ratio. As a result, it is possible to obtain the robot 1000 that enables a high power to weight ratio.

What is claimed is:

1. A piezoelectric driving device comprising:
a substrate;
a plurality of piezoelectric elements disposed on the substrate;
a first groove section provided between the plurality of piezoelectric elements; and
a first wire provided in at least a part of a side surface and a bottom section of the first groove section,
the piezoelectric driving device further comprising a supporting section supporting the substrate, wherein
a third wire and a third groove section are provided in the supporting section, and
the third wire is provided in at least a part of a side surface and a bottom section of the third groove section.

2. The piezoelectric driving device according to claim 1, wherein the first groove section is provided on the substrate.

3. The piezoelectric driving device according to claim 1, wherein the substrate is made of silicon.

4. The piezoelectric driving device according to claim 1, wherein
a plurality of the first wires and a plurality of the first groove sections are provided,
a second wire coupling the plurality of first wires and a second groove section coupled to the plurality of first groove sections are provided, and
the second ire is provided at least a part of a side surface and a bottom section of the second groove section.

5. The piezoelectric driving device according to claim 1, wherein the first wire, the second wire, and the third wire are wires for common electrode.

6. The piezoelectric driving device according to claim 5, wherein the first wire and the third wire are wires for driving electrode.

7. A robot comprising a piezoelectric motor including the piezoelectric driving device according to claim 1.

* * * * *